United States Patent Office 2,794,217
Patented June 4, 1957

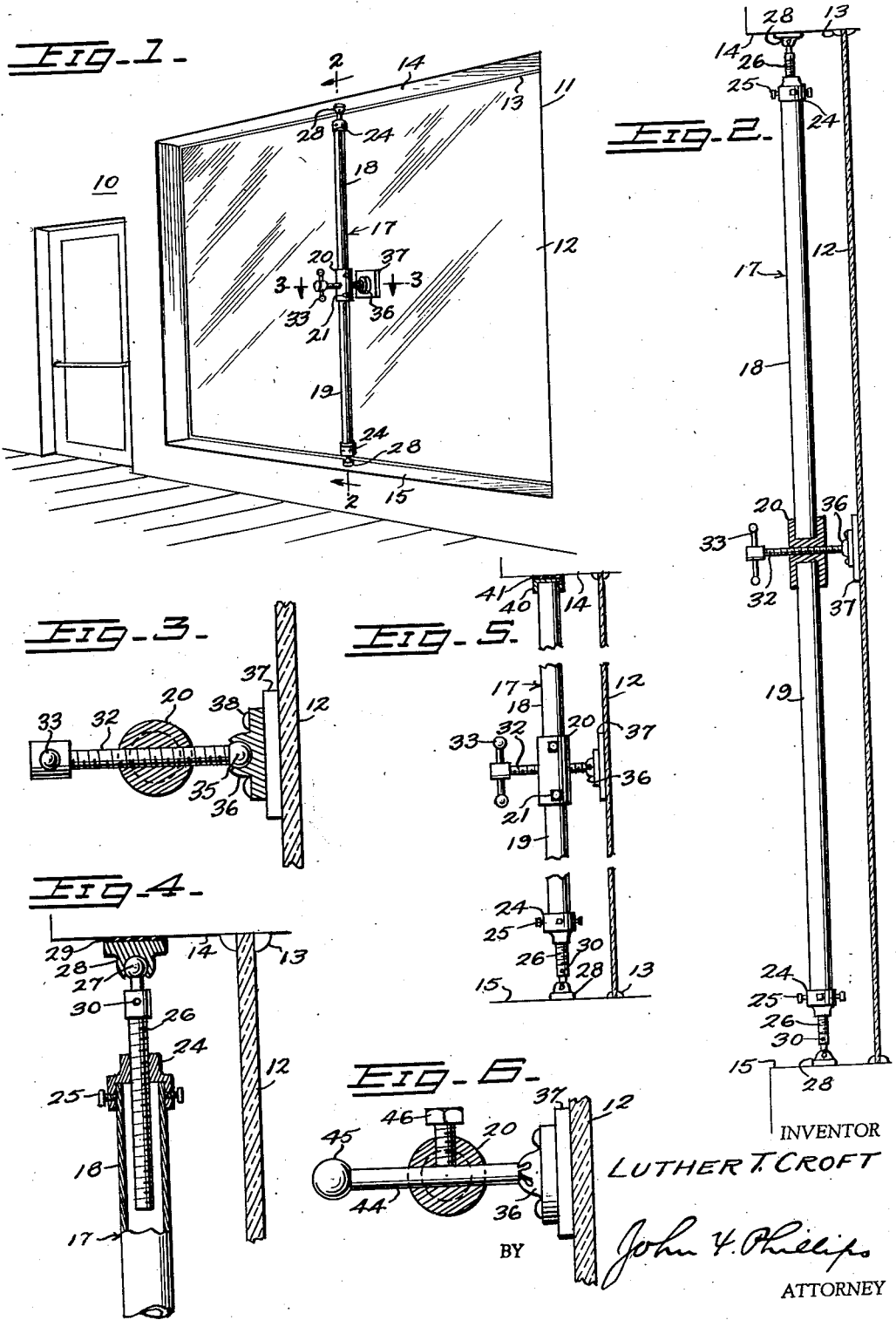

2,794,217

HURRICANE BRACE FOR WINDOWS

Luther T. Croft, Norfolk, Va.

Application October 12, 1955, Serial No. 540,018

11 Claims. (Cl. 20—40)

This invention relates to a hurricane brace for windows.

It is well known that storms of hurricane force cause tremendous losses through the breaking of plate glass windows, but the exact cause of such breakage is not fully understood. Plate glass possesses a higher degree of flexibility than is generally known and will withstand substantial wind pressures so far as the glass itself is concerned. However, plate glass windows are held tightly sealed between molding or similar structures at the edge of glass to prevent leakage of water therearound. Any appeciable flexing of the glass, which the latter in itself would withstand, frequently will result in the breaking of the glass because of the gripping of the edge portions in the manner stated. Moreover, in wind storms, plate glass windows often are set into vibration which can readily increase to the point where it assists the wind pressure in breaking the glass.

An important object of the present invention is to provide a novel construction capable of being installed in a matter of seconds to prevent breakage of plate glass windows by preventing the setting up of vibrations in the body of the glass and by preventing the flexing of the glass which so often causes breakage at the edge portions thereof.

A further object is to provide rigid supporting means adapted to be clamped in position adjacent a plate glass window wholly out of contact therewith, and to provide such support with an adjustable window-engaging device which prevents any inward flexing of the glass, thus preventing the starting of any vibratory action or any substantial flexing of the glass.

A further object is to provide such a device wherein a glass contact member engages against the inner surface of the glass at points spaced from the edges thereof to brace the glass against inward movement at such point, thus in effect dividing the glass into substantially smaller areas subject to wind pressures and thus rendering the glass capable of withstanding substantial wind forces while at the same time preventing any vibratory action in the glass.

A further object is to provide such a device wherein the rigid support is capable of being very quickly mounted in position relative to the glass by engaging upper and lower ends thereof against horizontal surfaces projecting inwardly from the glass, the support being provided with a longitudinally adjustable foot at one end thereof or both ends, which adjustable foot or feet can be quickly adjusted into gripping engagement with fixed surfaces adjacent the window, which quick positioning of the support can be followed very easily and very rapidly by the adjusting of the glass engaging element to bring it into contact with the inner surface of the glass.

Other objects and advantages of the invention will become apparent during the course of the following description.

In the drawing I have shown several embodiments of the invention. In this showing:

Figure 1 is a perspective view of an inner wall portion of a store or the like, showing the invention applied to a plate glass window;

Figure 2 is an enlarged vertical sectional view through the glass and a portion of the support taken on line 2—2 of Figure 1, portions of the support and other elements being shown in elevation;

Figure 3 is a detail sectional view on line 3—3 of Figure 1, the adjusting screw and glass engaging plate being shown in elevation;

Figure 4 is a detail vertical sectional view through the upper end of the support, showing its engagment with an overhanging horizontal wall surface adjacent the glass, a portion of the glass being illustrated;

Figure 5 is a view similar to Figure 2, parts being broken away, showing a modified form of support; and Figure 6 is a detail sectional view similar to Figure 3, parts being shown in elevation, illustrating a modified type of glass engaging unit.

In Figure 1, there is illustrated a portion of the inside of a store or the like having a wall 10 in which is formed a relatively large opening 11 covered by a plate glass window 12. This glass is fixed in position around its edges by a molding structure generally indicated by the numeral 13, such structure being conventional and forming no part of the present invention. The opening 11 is surrounded by a portion of the wall 10 defining such opening, including upper and lower horizontal surfaces 14 and 15 respectively.

The device forming the subject matter of the present invention comprises a support indicated as a whole by the numeral 17, and which support is rigid from end to end, as will become apparent. The support is formed of upper and lower pipe sections 18 and 19, respectively, the adjacent ends of which are spaced from each other as shown in Figure 2 and arranged in a double-ended socket 20. The pipe sections may be secured in such socket in any suitable manner, for example by set screws or the like 21.

The remote ends of the pipe sections 18 and 19 are provided with relatively heavy caps or sockets 24 secured to the associated pipe sections in any suitable manner, for example by set screws 25. Through each of the caps or sockets 24 is threaded a relatively heavy stem 26 the remote ends of which carry balls 27 mounted to rock in sockets 28 forming feet having flat horizontal remote surfaces normally parallel to each other and engageable respectively with the wall surfaces 14 and 15. If desired, the flat surfaces of the feet 28 may be provided with cushion layers 29 to engage the wall surfaces 14 and 15. The screws 26, adjacent the feet 28, may be provided with rod-receiving openings 30 to facilitate the tightening of the device in position, as described below. The layers 29 are preferably employed to insure against the slipping of the support and to prevent the marring of the wall surfaces 14 and 15.

As stated, the adjacent ends of the pipe sections 18 and 19 are spaced from each other, thus allowing for a solid formation of the central portion of the socket 20. A screw 32 is threaded through such portion of the socket 20 and is provided at its inner end with handle means 33 by which the screw 32 readily may be spun through the socket 20 for a purpose which will become apparent.

The opposite end of the screw 32 is provided with a ball 35 mounted to rock in a socket 36, preferably secured to a window engaging plate 37 of any desired material or construction. I have found that relatively thick plywood is ideal for use in making the plate 37, and the socket 36 may be secured thereto by screws 38 so that the plate 37 will be carried as a unit with the socket 36. The plate 37 preferably is made about 6" square, although obviously it may be made of any desired size.

The screws 26 may be carried at both ends of the support 10 to provide for a relatively great range of adjustment. If desired, only one such adjusting means need be provided, as shown in Fig. 5, wherein such means is carried by the lower end of the support 17. Except for the structure at the upper end of the support 17, the parts of the device in Figure 5 are identical with the parts previously described and have been indicated by the same reference numerals. Instead of the upper adjusting means, the upper end of the pipe section 18 may be provided with a cap 40 forming a foot carrying on its upper face a cushion layer 41 for the same purpose as the layer 29 previously described.

While it is preferred to employ a glass engaging unit including a threaded stem 32, the threading of the stem and the tapping of the center of the socket 20 may be avoided by using a smooth stem 44, as shown in Figure 6, slidable through the socket 20 and provided at its free end with a knob 45. The structure of the form of the invention shown in Figure 6 adjacent the glass 12 is identical with the form shown in Figure 3, and the parts have been indicated by the same reference numerals. The stem 44 is maintained in adjusted position by a set screw 46.

Operation

Upon receiving warning of an approaching hurricane, the storekeeper may bring out one of the present devices for each plate glass window in the store. The upper socket 28 will be placed in position against the overhanging surface 14, the screws 26 having been turned by hand to roughly adjust the over-all length of the support so that the lower socket 28 clears the surface 15. Holding the support upwardly in position, the operator will turn the lower screw 26 by hand, and the lower socket or foot 28 engages the surface 15. A rod will then be inserted through the opening 30 in the lower screw 26 to turn such screw and tightly engage the lower socket or foot 28 against the surface 15. It will be apparent that the ball and socket arrangement at the ends of the support permits an accurate seating of the sockets against the surfaces 14 and 15 and permits the lower screw 26 to turn in the lower socket or foot 28, without rotating the latter, to tightly clamp such socket against the surface 15. The support is now rigidly fixed in position, and the operator will rotate the handle 33 to bring the plate 37 into engagement with the glass 12, as shown in Figure 3.

Obviously, the point in the glass 12 of the character illustrated centrally of such glass will be subject to maximum flexing under outside wind pressures. The plate 37 prevents such flexing of the glass and obviously prevents the setting up of any vibratory action in the glass. Moreover, the contacting of the plate 37 with the glass has the effect of dividing the glass into four sections along imaginary lines centrally of the glass, extending vertically and horizontally relative thereto, and this has the effect of further greatly minimizing the maximum flexing of the glass. Accordingly, the glass is prevented from flexing in any portions thereof to an extent which might cause the gripping of the edge portions of the glass to result in the cracking thereof. It will be particularly noted that the structure of the socket 20 permits arrangement of the screw 32 diametrically of the support. Hence thrusts endwise of the screw 32 are absorbed axially of the support, there being no torsional forces transmitted to the support.

Where the glass is of such area as to justify it, two or more of the present devices may be employed. While a single socket 20 and its glass engaging unit have been illustrated, the invention is not limited to such construction since three or more pipe sections may be used, with sockets 20 connecting the adjacent ends of adjacent pairs of pipe sections. Moreover, the same effect can be obtained by arranging the support 17 horizontally instead of vertically. Various combinations of arrangements may be employed, it being essential, however, that the support be made as rigid as possible to damp out and, in fact, prevent the initiation of any vibratory action in the glass.

The operation of the forms of the invention shown in Figures 5 and 6 will be substantially identical with the operation described. The device in Figure 5 is placed in position merely by seating the cap or foot 40 or its cushion layer 41 against the overhanging surface 14, whereupon the lower screw 26 will be adjusted to clamp the support in position.

In the form of the device shown in Figure 6, the support, which may be of either of the types shown in Figures 2 or 5, is placed in position with the set screw 46 loose. The stem 44 then may be slid through the socket 20 to engage the plate 37 with the glass 12. The set screw 46 then may be tightened to fix the stem 44 rigidly in position relative to the support. A clamping action of the screw 32 in the other form of the invention is unnecessary since the screw cannot axially slide out of position. The device shown in Figure 6 is somewhat more economical to manufacture and completely satisfactory in operation, and merely requires the additional step of tightening the set screw 46. Obviously, the set screw may be provided with a head as shown in Figure 6, or any other type of turning means such as a wing head.

From the foregoing it will be apparent that the present device is not only simple in construction but is capable of being very quickly and easily placed in operative position without the use of any skill on the part of the operator.

The device readily can be stored in a closet or any other suitable place. To facilitate storage, it will be apparent that one or both of the pipe sections 18 or 19 may be removed from the socket 20 by loosening the set screws 21, thus materially shortening the over-all length of the device for storage.

The device in use is highly effective for preventing damage to plate glass windows by heavy winds, and the cost of one of the devices is a mere fraction of the cost of the plate glass which it so efficiently saves from damage of any kind.

It is to be understood that the forms of the invention shown and described are to be taken as preferred examples of the same and that various changes in the shape, size, and arrangement of the parts may be made as do not depart from the spirit of the invention or the scope of the appended claims.

I claim:

1. A hurricane brace for a window, comprising a support formed rigid from end to end and comprising a pair of tubular sections in axial alinement with their adjacent ends spaced from each other, a socket connecting such adjacent ends and provided therebetween with a solid portion, means at the remote ends of said tubular sections for clamping engagement against opposite parallel stationary surfaces adjacent the window, said solid portion of said socket being provided with a diametrical opening therethrough, a stem axially movable in such opening, and a glass engaging plate carried by said stem and engageable against the inner surface of the window.

2. A device according to claim 1 wherein at least one of said clamping members comprises a stem having threaded connection with the adjacent tubular section, a foot engageable with the adjacent one of said parallel surfaces, and a ball and socket joint connecting said threaded stem and said foot.

3. A device according to claim 1 wherein said axially movable stem and said glass engaging plate are provided with a ball and socket connection whereby said plate is capable of seating squarely against the inner surface of the window.

4. A hurricane brace for a glass window, comprising an elongated support rigid from end to end and comprising a pair of axially alined tubular members having spaced adjacent ends, a socket member provided with axially alined socket openings receiving the adjacent ends of said tubular members and being provided between said tubular members with a solid portion, a cap carried by each of the remote ends of said tubular members, means carried by said caps for clamping engagement with stationary parallel surfaces adjacent the window, said solid portion of said socket having an opening therethrough, a stem axially movable through said opening diametrically of said tubular members, and a glass engaging plate carried by said stem and engageable against the inner surface of the window.

5. A device according to claim 4 wherein at least one of said clamping means comprises an axial screw threaded in one of said caps, and a foot carried by said screw and engageable against one of said stationary parallel surfaces.

6. A device according to claim 4 wherein at least one of said clamping means comprises an axial screw threaded through one of said caps, a foot member engageable against one of said stationary parallel surfaces, and a ball and socket joint connecting said screw to said foot member.

7. A device according to claim 4 wherein said opening in said solid portion of said socket is threaded, said axially movable stem being threaded in such opening.

8. A device according to claim 4 wherein said axially movable stem is slidable through said socket members, and means for fixing such stem in position with said plate in engagement with the glass.

9. A device in accordance with claim 4 wherein one of said clamping means comprises a surface of one of said caps, the other clamping means comprising a screw axially threaded through the other of said caps, and a foot member universally connected to said screw and engageable with the adjacent stationary surface.

10. In combination with a window arranged in a wall opening having opposite parallel surfaces, a support formed rigid from end to end, a screw axially threaded in one end of said support, a foot carried by said screw, said foot and the other end of said support being engageable against said parallel wall surfaces and being movable into rigid clamped engagement therewith by operation of said screw, a stem axially movable through said support intermediate the ends thereof, and a rigid glass engaging plate carried by said stem and engageable against the inner surface of the window.

11. In combination with a glass window arranged in a wall opening having opposite parallel surfaces, an elongated rigid support comprising a pair of axially alined tubular members having spaced adjacent ends, a socket member provided with axially alined socket openings at opposite ends thereof receiving the adjacent ends of said tubular members and being provided between said tubular members with a solid portion having a diametrical opening therethrough, a screw threaded in the end of one of said tubular members remote from said socket, a foot carried by said screw, said foot and the remote end of the other tubular member being movable into clamped engagement with said parallel surfaces by operation of said screw, a stem axially movable through said opening, and a glass engaging plate carried by said stem and engageable against the inner surface of the window.

References Cited in the file of this patent

UNITED STATES PATENTS

| 1,460,645 | Duncan | July 3, 1923 |

FOREIGN PATENTS

| 544,075 | Great Britain | Mar. 26, 1942 |